United States Patent Office 2,986,506
Patented May 30, 1961

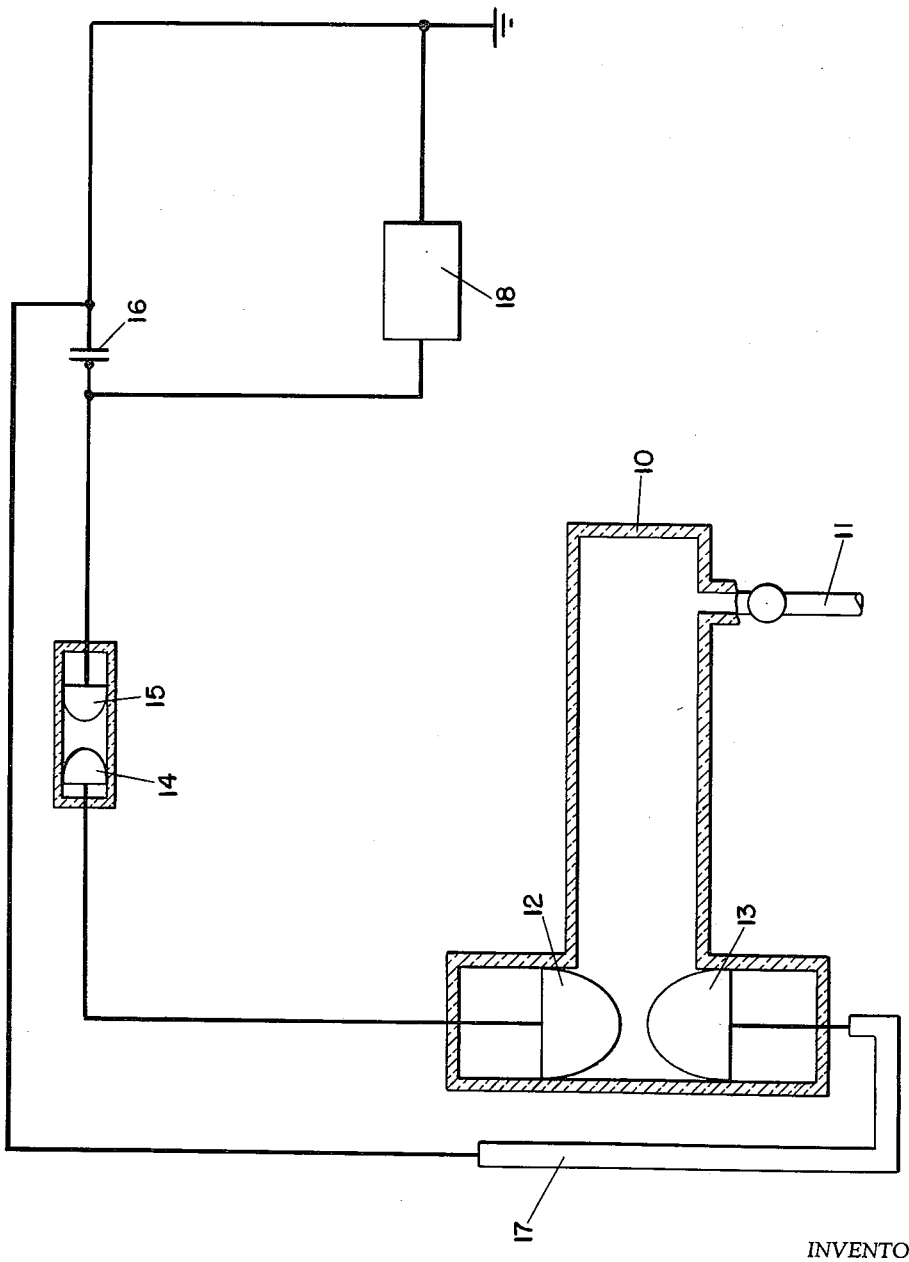

2,986,506
PREPARATION OF HCN AND ACETYLENE

Patrick J. Friel, Broomall, and James L. Lauer, Philadelphia, Pa., assignors to Sun Oil Company, Philadelphia, Pa., a corporation of New Jersey Filed Oct. 22, 1958, Ser. No. 769,016
2 Claims. (Cl. 204—156)

This invention relates to the production of hydrogen cyanide and acetylene, and more particularly to a process in which mixtures of hydrocarbons and nitrogen are subjected to a substantially simultaneous electric discharge and a magnetically driven shock wave whereby to increase the yield of hydrogen cyanide and acetylene over that obtained when an electrical discharge alone is used.

Conversion of mixtures of nitrogen and hydrocarbons to acetylene and hydrogen cyanide by passing the mixture through an electric arc is well known to the art. We have now discovered that the yield of acetylene and hydrogen cyanide, per unit of electrical power, may be substantially increased by subjecting the mixture of hydrocarbons and nitrogen to the influence of a magnetically driven shock wave at the same time as it is subjected to the electrical discharge. This may be accomplished by subjecting the nitrogen-hydrocarbon mixture to a series of discontinuous spark discharges across a pair of electrodes, of which the ground electrode is connected to a lead parallel to the spark gap, and closely spaced thereto. The magnetic field of this lead is perpendicular to the discharge current, so that when a discharge is struck between the electrodes there is a force exerted across the discharge which increases the velocity of the shock wave generated by the heating effect of the spark.

In order that those skilled in the art may more fully understand the nature of our invention, it will be more fully described in connection with the following drawing which is a sketch of an apparatus useful in practicing the invention.

Referring now to the drawing, reaction tube 10 is provided with valved line 11 leading to a suitable means for regulating the pressure in tube 10, such as a vacuum pump (not shown). A pair of stainless steel electrodes 12 and 13, respectively, having a spark gap therebetween are located in tube 10 adjacent one end thereof. A second pair of electrodes 14 and 15, and a capacitor 16 are connected in series with electrodes 12 and 13, the break-down voltage of the gap between electrodes 14 and 15 being higher than that of the gap between electrodes 12 and 13. Ground lead 17, which is connected to electrode 13, is formed of heavy brass strap, and passes upwardly in close juxtaposition to the gap between electrodes 12 and 13. Capacitor 16 is energized by a high voltage power supply 18.

In the operation of the apparatus, reactor 10 is filled with a mixture of hydrocarbon and nitrogen, and the pressure within reactor 10, is adjusted to the desired value. The $N_2:C$ ratios in the reaction mixture should be within the range of about 4:1 to 1:2, best results being obtained at ratios of from about 2:1 to about 1:1. The pressures are preferably low, from about 20 mm. to about 60 mm. of mercury absolute, although atmospheric or higher pressures may be used.

Capacitor 16 is then charged by power supply 18 to a voltage sufficient to break down the gap between electrodes 14 and 15. Since the break-down voltage between electrodes 12 and 13 is less than that between electrodes 14 and 15, the spark will jump the gap between electrodes 12 and 13. When this happens, the gas between the electrodes is suddenly heated to a high temperature and a rapid expansion results. This rapid expansion generates a shock wave which propagates along the length of reactor 10. Simultaneously, current flowing through ground lead 17 sets up a magnetic field which exerts a force in the same direction as the travel of the shock wave. The combination of the electric discharge and the magnetically driven shock wave serves to convert a far higher percentage of the hydrocarbon-nitrogen mixture to HCN and acetylene than when using the electric discharge alone, for a given amount of energy input.

Table I sets forth comparative results obtained under one set of process conditions using an electric discharge alone, and an electric discharge in combination with magnetic drive. In obtaining this data, an apparatus similar to that described in connection with the drawing was used. The power supply 18 was a direct current 30,000 volt, 200 microampere source obtained from, and the capacitor 16 was a 25,000 volt, 1.6 microfarads, 0.025 microhenry capacitor. With this equipment it was possible to jump the spark gap between electrodes 14 and 15 about once every 30 seconds. The break-down voltage of the gap between electrodes 14 and 15 was about 21,000 volts. In the run utilizing magnetic drive ground lead 17 was placed as indicated in Fig. 1, while in the run without magnetic drive ground lead 17 was moved about 12 cm. away from the spark gap, and a grounded iron screen was placed between the ground lead and the spark gap to provide additional magnetic screening. The hydrocarbon used was methane, in order to standardize the feed stock in each run. However, in the commercial practice of our invention, it may be preferable to use other hydrocarbons which are volatile at the reaction temperautre, such as the mixture of hydrocarbons found in natural gas.

Table I

|  | With Magnetic Drive | No Magnetic Drive |
|---|---|---|
| Original Pressure in Reactor (mm. Hg) | 57.4 | 58.1 |
| Final Pressure in Reactor (mm. Hg) | 72.1 | 72.3 |
| Energy input (Watt-hours) | 1.44 | 1.44 |
| Mol percent $N_2$ in charge | 54.6 | 53.6 |
| Mol percent $CH_4$ in charge | 45.4 | 46.4 |
| Yield (Mol percent) based on $CH_4$ charged: |  |  |
| HCN | 9.2 | 5.9 |
| Acetylene | 42.1 | 27.8 |

As may be observed from the foregoing, magnetic drive increased the yield of both HCN and acetylene by over 50% at the same power input.

The data in Table II illustrates the yields of HCN and acetylene which may be obtained according to the present invention at various nitrogen-methane ratios. The runs in which the data were obtained all utilized magnetic drive.

Table II

| Run No. | 1 | 2 | 3 | 4 | 5 |
|---|---|---|---|---|---|
| Original Pressure in Reactor (mm. Hg) | 22.4 | 23.0 | 22.3 | 24.4 | 23.1 |
| Energy input (Watt-hrs.) | 1.07 | 1.96 | 1.83 | 1.76 | 1.61 |
| Mol percent $N_2$ in charge | 79.9 | 65.7 | 55.2 | 58.2 | 37.2 |
| Mol percent $CH_4$ in charge | 20.1 | 34.3 | 44.8 | 41.8 | 62.8 |
| Yield (Mol percent) based on $CH_4$ in charge: |  |  |  |  |  |
| HCN | 16.9 | 22.5 | 16.6 | 17.1 | 4.6 |
| Acetylene | 31.2 | 54.6 | 61.2 | 54.9 | 47.4 |

The invention claimed is:
1. A process for the production of hydrogen cyanide and acetylene which comprises subjecting a gaseous charge stock comprising methane and nitrogen confined in a closed reactor to a series of discontinuous direct current electric spark discharges and substantially simultaneously to a series of magnetically-driven shock waves of sufficient intensity to enhance the production of hydrogen cyanide and acetylene.

2. A process for the production of hydrogen cyanide and acetylene which comprises subjecting a mixture of methane and nitrogen in an $N_2:C$ ratio within the range of about 4:1 to 1:2 to a series of discontinuous direct current electric spark discharges to produce shock waves and substantially simultaneously to an intermittent magnetic field acting perpendicular to the spark discharge to increase the velocity of the shock wave along the length of a closed reaction tube thereby enhancing the production of acetylene and hydrogen cyanide.

References Cited in the file of this patent

UNITED STATES PATENTS

| | | |
|---|---|---|
| 1,902,384 | Steinbuch et al. | Mar. 21, 1933 |
| 2,745,861 | Bodine | May 15, 1954 |
| 2,832,666 | Hertzberg et al. | Apr. 29, 1958 |

FOREIGN PATENTS

| | | |
|---|---|---|
| 5,688 of 1904 | Great Britain | Jan. 12, 1905 |
| 16,636 of 1911 | Great Britain | Apr. 25, 1912 |

OTHER REFERENCES

Landshoff: Magnetohydrodynamics (April 1957), pages 76–91.